(12) United States Patent
Silvestrini et al.

(10) Patent No.: US 12,102,266 B2
(45) Date of Patent: Oct. 1, 2024

(54) APPLIANCE FOR PROCESSING FOODS

(71) Applicant: DE'LONGHI BRAUN HOUSEHOLD GMBH, Neu-Isenburg (DE)

(72) Inventors: Gian Luca Silvestrini, Frankfurt am Main (DE); Duy-Phong Vu, Schwalbach am Taunus (DE); Markus Ungerer, Muehltal (DE); Olga Stoppel, Hofheim (DE); Mirja De Luca, Wiesbaden (DE)

(73) Assignee: DE'LONGHI BRAUN HOUSEHOLD GMBH, Neu-Isenburg (DE)

( * ) Notice: Subject to any disclaimer, the term of this patent is extended or adjusted under 35 U.S.C. 154(b) by 673 days.

(21) Appl. No.: 17/309,438

(22) PCT Filed: Jul. 10, 2019

(86) PCT No.: PCT/EP2019/068560
§ 371 (c)(1),
(2) Date: May 27, 2021

(87) PCT Pub. No.: WO2020/108807
PCT Pub. Date: Jun. 4, 2020

(65) Prior Publication Data
US 2022/0022694 A1    Jan. 27, 2022

(30) Foreign Application Priority Data
Nov. 28, 2018  (DE) .......................... 102018220446.2

(51) Int. Cl.
A47J 43/07    (2006.01)
A47J 43/046   (2006.01)
(Continued)

(52) U.S. Cl.
CPC ......... *A47J 43/0727* (2013.01); *A47J 43/046* (2013.01); *A47J 43/085* (2013.01);
(Continued)

(58) Field of Classification Search
CPC .... B01F 29/40111; B01F 29/30; B01F 29/81; B01F 31/22; B01F 2101/44;
(Continued)

(56) References Cited

U.S. PATENT DOCUMENTS 6,398,403 B1    6/2002  Rebordosa et al.
10,258,200 B2   4/2019  Wolf et al.
(Continued)

FOREIGN PATENT DOCUMENTS

CN    201022626 Y    2/2008
CN    205107451 U    3/2016
(Continued)

OTHER PUBLICATIONS

English Translation of International Search Report and Written Opinion of the International Searching Authority, dated Sep. 11, 2019, with respect to International Application No. PCT/EP2019/068560.
(Continued)

*Primary Examiner* — Charles Cooley
(74) *Attorney, Agent, or Firm* — Scott R. Cox (57) ABSTRACT

An appliance for processing food including a vessel with walls that defines chamber in which foods to be processed are received, and a working part arranged in the chamber, which can be driven to process the foods, wherein the chamber defined by the walls has a form which is substantially a spherical segment at least in part, wherein the spherical segment form surrounds the working part.

21 Claims, 6 Drawing Sheets

(51) Int. Cl.
  *A47J 43/08* (2006.01)
  *A47J 45/06* (2006.01)
  *A47J 45/07* (2006.01)
  *B01F 27/86* (2022.01)
  *B01F 29/00* (2022.01)
  *B01F 35/00* (2022.01)
  *B01F 35/53* (2022.01)

(52) U.S. Cl.
  CPC .......... *A47J 45/062* (2013.01); *A47J 45/072* (2013.01); *B01F 27/86* (2022.01); *B01F 29/40221* (2022.01); *B01F 35/5312* (2022.01); *B01F 35/55* (2022.01)

(58) Field of Classification Search
  CPC .......... B01F 29/4011; B01F 29/40221; B01F 35/531; B01F 29/40222; B01F 35/5311; B01F 35/5312; B01F 35/532; B01F 35/55; B01F 27/86; B01F 35/53; C12M 27/06; C12M 27/10; C12M 27/16; C12M 27/12; C12M 27/20; A47J 43/0727; A47J 43/046; A47J 43/085; A47J 45/062; A47J 45/072
  USPC ..... 366/213, 214, 200, 306, 307; 435/304.2; 220/669, 675
  See application file for complete search history.

(56) References Cited

U.S. PATENT DOCUMENTS

| 10,278,542 | B2 | 5/2019 | Wolf et al. |
| 2005/0122837 | A1 | 6/2005 | Bravard et al. |
| 2012/0170404 | A1 | 7/2012 | Drees et al. |
| 2014/0246442 | A1 | 9/2014 | Benoit et al. |
| 2014/0263789 | A1 | 9/2014 | Nernberger et al. |
| 2020/0061556 | A1* | 2/2020 | Yarborough .......... B01F 35/531 |
| 2020/0359840 | A1 | 11/2020 | Li et al. |
| 2022/0022694 | A1 | 1/2022 | Silvestrini et al. |
| 2023/0038281 | A1* | 2/2023 | Gee, II .................. A47J 43/044 |

FOREIGN PATENT DOCUMENTS

| CN | 107028473 | A | 8/2017 |
| CN | 206603688 | U | 11/2017 |
| CN | 206964549 | U | 2/2018 |
| CN | 207768225 | U | 8/2018 |
| FR | 2364012 | A1 | 4/1978 |
| GB | 1388119 | | 3/1975 |
| GB | 2560431 | A | 9/2018 |
| JP | S56 001535 | U | 1/1981 |
| JP | H03 193013 | A | 8/1991 |
| JP | 2013022286 | | 2/2013 |
| WO | 2007075167 | A1 | 7/2007 |
| WO | 2009117049 | A2 | 9/2009 |
| WO | WO-2020041422 | A1 * | 2/2020 .......... B01F 11/0014 |

OTHER PUBLICATIONS

English Translation of International Preliminary Report on Patentability of the International Searching Authority, dated May 25, 2021, with respect to International Application No. PCT/EP2019/068560.

English Translation of Official Action from Japanese Patent Office dated Aug. 15, 2022, in corresponding parallel Japanese Application No. 2021-530221—cited only for references disclosed therein.

English Translation of Official Action from Russian Patent Office dated Dec. 29, 2021, in corresponding parallel Russian Application No. 2021117206/03 (036207)—cited only for references disclosed therein. Other non-cited references previously disclosed.

U.S. Appl. No. 17/310,451, unpublished, Aug. 2021.

* cited by examiner

APPLIANCE FOR PROCESSING FOODS

TECHNICAL FIELD

The present invention relates to an appliance for processing foods.

PRIOR ART

Appliances that are used in the home to process foods, such as blenders, for example, are known from the prior art. In the case of such blenders, a vessel is mounted on a base which typically contains a motor. This motor can drive a working part (for example in the form of rotatable blades) arranged in the vessel. These blades interact with the foods in the vessel and process them.

Typical vessels are in the form of a jug, wherein the diameter in a cross section parallel to the horizontal is considerably smaller than the total length of the vessel along the rotational axis of the working part—in other words, the vessels are slim. The cross-sectional shape may, for example, be round, triangular, rectangular or square, and can also change from one shape to another along the height of the vessel. Ribs are often arranged inside the vessel, which for the most part extend from the bottom to the maximum filling height. These ribs serve to improve the flow and circulation of foods within the vessel. An example of such a vessel is presented in GB 1 388 119 A.

The working part, or blades, is/are arranged at the bottom of the vessel. The vessel can be made of various materials, such as plastic or glass, for example, which can be injection-molded or blown. At the top of the vessel is a lid, which may have a removable cover in the middle thereof to facilitate adding fluids or other ingredients during processing. Such a vessel often has a spout at the top to facilitate serving the foods produced easily and without spillages.

Such blenders can also be used to make soy milk or fruit juices. For this, an additional cylindrical filter is typically used, which surrounds the blades or the working part and which is fixed by means of the lid.

DESCRIPTION OF THE INVENTION

The inventors noticed that the prior art blenders have disadvantages. For example, blenders with a typical filling capacity of approximately 2 l are comparatively tall, and therefore it is difficult to use or store them upright in a cupboard in a kitchen or under a kitchen wall unit. The ratio of height to maximum filling capacity is therefore inefficient. Furthermore, the inventors realized that on account of the comparatively great height of the blender in relation to the maximum filling capacity, it takes a long time until all the foods have been processed, which can then also result in the foods being heated by the friction and losing its nutritional value. Owing to the small cross section compared to the height, it takes a long time until all of the foods have been passed by the working part sufficiently frequently for a satisfactory result to be achieved. As a result of the friction caused by the movement in the foods being processed and the mechanical components of the blender, the foods can sometimes heat up quite considerably.

The inventors also noticed that there are often very uneven results when crushing ice cubes. This is due to the fact that the working part usually extends over the entire bottom surface of the vessel and therefore the already crushed ice repeatedly comes into contact with the working part and is thus crushed too much and is additionally heated and therefore melts. Some of the bigger ice cubes are not touched by the working part, however, or are only touched to a limited extent, and are therefore not crushed since generally the already crushed ice cubes settle in the lower region of the vessel in which the working part is located and the larger ice cubes therefore no longer come into contact with the working part. Accordingly, when crushing ice cubes there is an inconsistent result, wherein comparatively large pieces of ice float in icy water and these are then not reached by the blades, or are only reached to a limited extent.

The inventors noticed a further disadvantage when making soy milk. When soy milk is made, the soaked soy beans are placed in a typically cylindrical filter which is inserted into the vessel and which surrounds the working part. Such an arrangement is shown in CN201022626Y, for example. The beans are crushed inside the filter. The milk is then pushed out through the filter due to the movement of the working part, and collects in the intermediate space between the outer wall of the filter and the inner wall of the surrounding vessel. With a typical, comparatively "slim" vessel, however, there is only a small amount of space outside the filter for receiving the soy milk produced. Thus, the filling capacity is comparatively small.

The present invention was made to avoid the disadvantages set out above. The invention is defined by claim 1.

According to claim 1, an appliance for processing foods comprises a vessel. This vessel is defined by walls, which in turn define a chamber in which the foods to be processed can be received. In other words, this vessel constitutes the component in which the foods to be processed are processed. The appliance according to the invention may, in particular, be a blender. In principle, however, it would also be conceivable for this appliance to be a mill (for example a coffee mill) or a food processor. Other applications are also conceivable.

A working part is arranged inside this chamber. This working part may typically be a rotatably mounted blade, which can be rotated in the vessel, thereby processing the foods located in said vessel.

According to the invention, the chamber defined by the walls has a form which is substantially a spherical segment at least in part. A spherical form is to be understood here to mean that the walls are at a constant distance or radius from a center located inside the sphere. The fact that the form is only "substantially" a spherical segment or spherical form is to be understood such that protrusions may optionally be provided on the inner wall, which extend into the interior (or even protuberances that extend out from the internal space), as long as the overall shape of the interior is still recognizable as a spherical segment or sphere. The fact that the form of the chamber is a spherical segment is to be understood such that the chamber does not have to be a complete sphere (but it can be). A spherical segment is to be understood here to be a segment of a sphere which is obtained by making one or more straight cuts along a plane in a complete sphere, thus removing part of the sphere while retaining part of the spherical surface. In the present case, the term "sphere" is to be understood to mean a sphere in the mathematical sense, i.e. a geometric object whose boundary is at a constant distance from a center. However, as already mentioned above, slight deviations from an ideal spherical form are possible.

The inventors realized that such a substantially spherical vessel is very efficient in terms of use of space: a sphere having the same filling capacity, and the same dimensions of the bottom of the vessel and of the working part located therein, has a smaller height than a slim vessel, as already described above. A sphere is the body having the best ratio of maximum dimensions to volume. Thus, the overall height of the appliance for processing foods can be reduced with such a vessel. A cylinder circumscribing the sphere on the outside with the same diameter would have an even smaller height while offering the same volume, but it would entail the working part having to be enlarged in accordance with the larger diameter of the bottom of the vessel in order to process foods efficiently with minimal dead space between the working part and the vessel wall. The claimed design therefore reduces the amount of space required for storage and during use on the work surface or under a wall cabinet.

Moreover, when producing foods such as purees or smoothies it allows for better circulation than with a cylindrical or conical form. One of the reasons for this is that on account of the spherical form the average distance of the foods to be processed to the blade is smaller and therefore a quicker circulation can take place. Owing to the better circulation, the processing duration is reduced, and the foods to be processed can also be prevented from unnecessarily heating up too much as a result of the friction, which is undesirable for cold drinks such as smoothies, shakes and cocktails and can also lead to the nutrients being depleted. Thus, foods processed with such an appliance are of a higher quality. Moreover, when making soy milk using a cylindrical filter as described above, the spherical design results in an additional volume for the soy milk, which is pushed through the filter. The potential filling capacity for the soy milk can therefore be increased.

The aforementioned advantages also arise, although possibly only to a lesser extent, when just the lid of the vessel is in the form of a spherical segment, while the bottom part is any shape. In this case, the shape of the lid would result in an improved circulation of the foods to be processed, provided that a correspondingly high fill level is achieved.

Preferably, the spherical segment form surrounds the working part along all three dimensions.

The feature that the spherical segment form surrounds the working part is to be understood such that the working part moves in the chamber that is defined by the spherical segment. This means that the foods processed by the working part are processed inside the chamber, which is a spherical segment. Typically, the working part and therefore also the spherical segment are located on the bottom side of the appliance (i.e. the side of the appliance which is at the bottom when the appliance is used as intended). Such a spherical segment on the bottom side of the appliance can be cut at the bottom, i.e. it can be flat, which means that the spherical segment has been produced inter alia from a sphere which has been cut flat parallel to the bottom side. Alternatively, however, the surface closing the spherical segment at the bottom can also have a different shape, deviating from the spherical shape.

The results obtained when crushing ice are better since the already crushed ice can collect in the bulge created by the spherical form radially outside of the working part and does not come into contact again with the working part and start melting as a result of too much contact therewith. This also allows the ice cubes that have not yet been crushed to better reach the working part and be crushed down more. This results in an improved uniformity of the crushed ice cubes and therefore in a higher capacity for processing.

In particular, what is envisaged here is that the working part is arranged in a rotatable manner and the radius of the working part with respect to the rotational axis is less than 50% of the radius of the spherical segment.

Preferably, the spherical segment comprises a segment of the sphere which is larger than a hemisphere. Preferably, the spherical segment comprises more than 70% of a total surface area of the sphere, and more preferably still, the spherical segment is a sphere. This ensures that the advantageous effects of using a spherical segment arise over a large part of the vessel or over the entire vessel, which results in the aforementioned advantages to a large extent being achieved.

Preferably, the vessel has a first and a second segment which are detachably connected to one another and which together define the spherical segment. In this case, the first segment surrounds the working part and the second segment can be arranged on the first segment (i.e. it is located above the first segment). Due to the detachable arrangement of the first and second segments, the vessel is easier to clean, and the appliance can be stored in a more space-efficient manner, since by removing the second segment from the first segment, the height can be reduced.

In this connection, it is particularly preferable for the first and second segments to together define a sphere as the spherical segment. The second segment has an opening through which ingredients to be processed can be introduced into the chamber even when the appliance is in operation. It is also possible to introduce other foods in this way. The processing of foods is made easier on account of the presence of the opening, since foods can be subsequently introduced into the chamber.

Moreover, it is preferred that a third segment is provided, which is detachably arranged on the second segment. The second segment is annular and the second and third segments together define a hemisphere, wherein the first segment also substantially defines a hemisphere. In this regard, however, it is particularly preferable for the first segment to comprise more than one hemisphere and at the top, like a standard blender, a small lid with a filling opening closes this opening. The third segment preferably has an opening through which ingredients to be processed can be introduced into the chamber. In this way, in particular on account of the presence of the third segment, which can be detached from the second segment, a bigger opening can be made than in the aforementioned alternatives, through which additional foods can be introduced into the chamber.

Preferably, the second segment can be arranged within the first segment. Such a design allows the appliance to be stowed away in a space-efficient manner.

Preferably, the first and second segments can be fastened together by means of a bayonet catch. Such a bayonet catch is simple to implement and can easily be released without tools. However, other possible closure means are also possible, in particular snap-fit connections, toggle levers or threads.

Moreover, it is preferred that the appliance has a spout on the vessel for pouring out foods that have been processed. Such a spout facilitates the serving of processed foods.

Furthermore, the appliance preferably has a base on which the vessel is arranged, wherein the vessel can preferably be detached from the base. If the vessel can be detached from the base, the vessel can be used, for example, to serve the processed foods.

The base preferably also has an electric drive for driving the working part.

Preferably, the vessel has a handle, which is optionally detachable from the vessel. Such a handle allows the vessel to be moved more easily. If it is detachable, it can also be removed to improve the optical appearance. The chamber can also be reduced, which is necessary for storing the vessel.

Moreover, it is preferable for ribs to be provided on the inside of the vessel. These improve the processing of the foods by improving the circulation thereof.

If the appliance has a spout, it is conceivable that this spout extends from one of the ribs. Coupling the spout to the ribs guides the foods to be processed in the right direction, thereby facilitating the pouring out process.

Moreover, it is preferred that the appliance has one or more inner bulges. These are provided in the space between two ribs and extend into the interior of the vessel. Preferably, these inner bulges are provided between all of the ribs. Such an inner bulge is a protrusion which extends into the interior of the vessel. Compared to the ribs, the inner bulges are wider, i.e. the inner bulges extend along the circumferential direction over a longer length than the ribs. Furthermore, they also protrude less than the ribs. In other words, the inner bulges are designed to be flatter than the ribs, i.e. the angle of inclination of the inner bulges at the transition to the inner wall of the vessel is smaller than the corresponding angle of inclination of the ribs, and decreases steadily as you move toward the center of the inner bulges.

The provision of these inner bulges prevents a kind of dead space or pocket being formed between the ribs, in which tough foods and larger pieces of food to be processed can get stuck. If this happens, there is the risk that the blade or more generally the working part rotates freely without the foods moving back to the working part and being processed. The provision of inner bulges prevents foods from being able to collect there. This then results in the vessel functioning properly even for tough foods, which would not be the case without these inner bulges. The inner bulges partially fill the dead space between the ribs and bring more dynamism to the conveyance of the foods to be processed and also accelerate this. This then results in the mass to be processed not accumulating at this point but instead being guided back to the working part or blade, without the flow being significantly diverted in the process and without the processing behavior of the vessel being completely changed, as would be the case with conventional ribs which protrude further and project more steeply. Introducing additional ribs instead of inner bulges would also only create further dead spaces and therefore make the processing of tough foods even worse.

Preferably, the inner bulges have an inclination with respect to the wall of the vessel that is smaller than or equal to 30°. This means that the inclination of the tangent plane of the inner bulges at the transition to the wall with respect to the tangent plane of the wall itself at this transition is smaller than or equal to 30°. In this way, a comparatively flat inclination of the inner bulges with respect to the wall of the vessel is defined, such that the flow is only slightly deflected, which is advantageous for the processing behavior.

Preferably, the inner bulges fill at least 30%, preferably at least 45%, of the area between the ribs. This ensures that the inner bulges are sufficiently large that they have a demonstrable effect on the processing behavior of the appliance.

Moreover, it is preferable for the length of the inner bulges along the circumferential direction of the vessel to be at least 60% of the distance between the ribs along the circumferential direction. This also ensures that the inner bulges are sufficiently large that they have a significant impact on the processing of foods.

Preferably, the length of the inner bulges along the circumferential direction of the vessel is at least 60% of the distance along the circumferential direction between the ribs. This also ensures that the inner bulges are sufficiently large to result in a significant processing of foods and to have a demonstrable effect on the processing behavior of the appliance.

Preferably, the ratio of the width b to the length L of the inner bulges at the widest point of the inner bulges is greater than or equal to 0.8, while the ratio of the width b to the length L of the ribs at the widest point of the ribs is smaller than or equal to 0.4. This also defines the different shape of the width of the ribs and of the inner bulges.

Moreover, it is preferable for the ratio of the depth t to the width b at the deepest point of the inner bulges to be smaller than or equal to 0.1, while the ratio of the depth t to the width b at the deepest point of the ribs is greater than or equal to 0.5. This means that the ribs extend further inward, while the inner bulges are comparatively flat. Thus, this feature reinforces the fact that the foods are guided inward by the inner bulges.

Moreover, it is preferred that a side wall of the appliance is flat or level. This facilitates the storage of the appliance since the appliance can be placed directly against a flat wall, for example in a kitchen cabinet. Furthermore, in addition to the ribs, the change in shape that occurs at the transition from spherical form to the flat form also influences and optimizes the circulation of the foods to be processed inside the vessel.

BRIEF DESCRIPTION OF THE DRAWINGS

FIG. 6 a) and b) show an appliance according to a fourth embodiment of the invention.

DETAILED DESCRIPTION OF THE DRAWINGS

Figure 1:
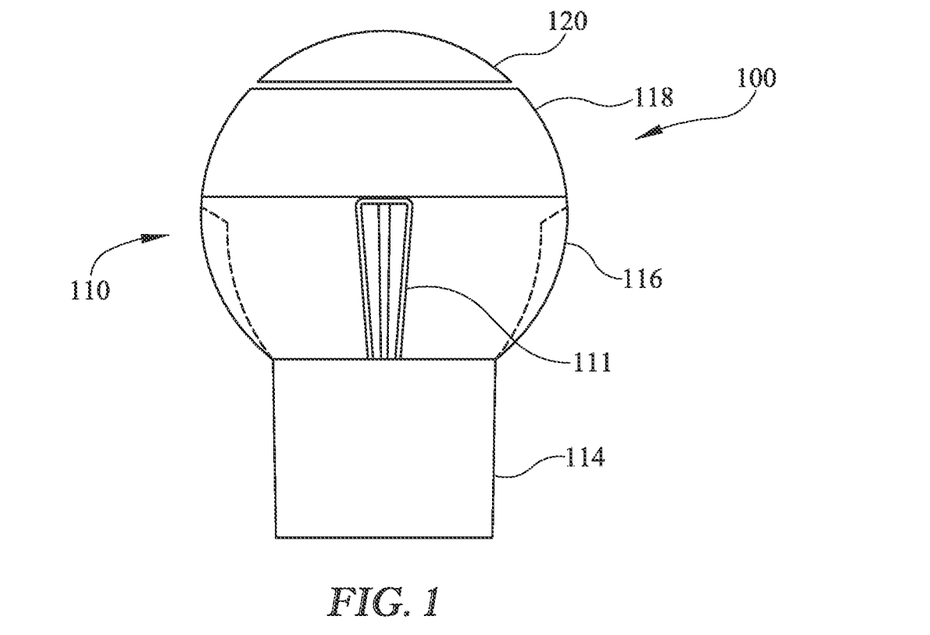
FIG. 1 schematically shows a cross section through an appliance according to a first embodiment of the invention.
Figure 5:
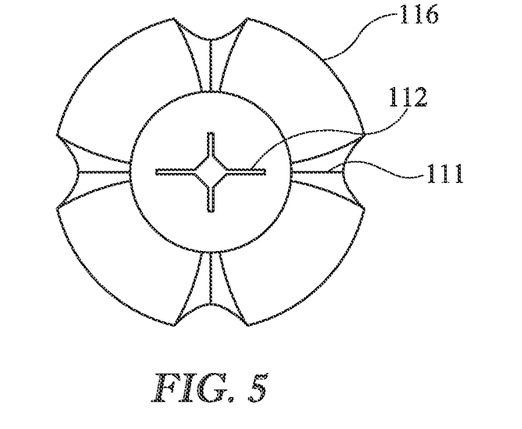
FIG. 5 is a plan view of the bottom part of the appliance according to the first embodiment of the invention.
Figure 6:
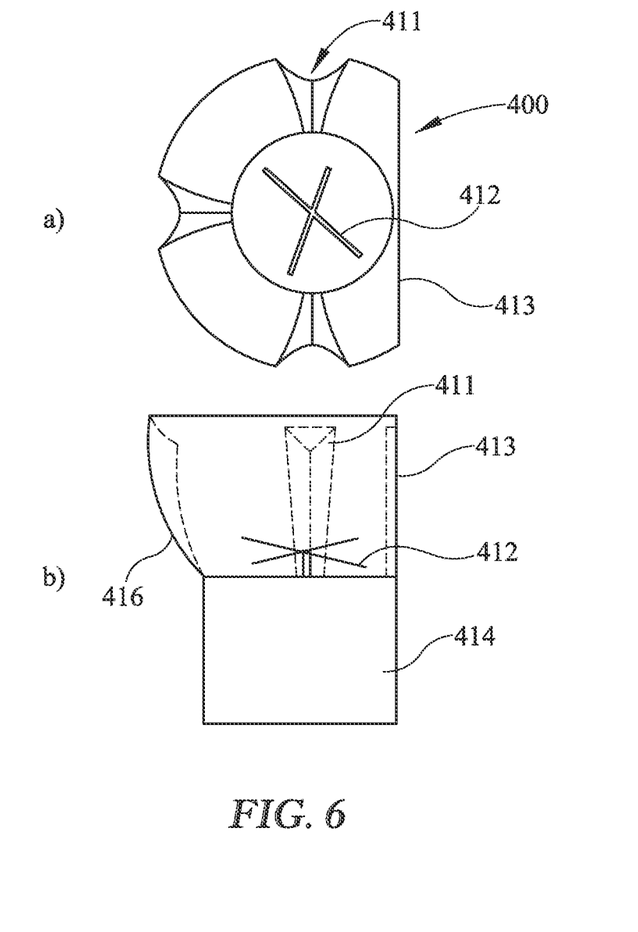

FIGS. 1 and 5 schematically show an appliance 100 according to a first embodiment of the invention. A base 114 supports a first segment 116 on the upper side thereof, which segment is in the form of a hemisphere whose bottom side is cut off flat. Inside this first segment 116 is a working part 112, which is schematically shown and which can be driven by a motor (not shown) inside the base 114.

A second segment 118 is arranged on the first segment 116, which can be locked to the first segment 116 by means of a bayonet catch or different closure means. A lid 120 is provided on the second segment 118, which closes the appliance. The first segment 116 defines a cut-off hemisphere. This means that the cut-off sphere resulting from the lid 120, the second segment 180 and the first segment 116 is divided along the center plane of the original sphere. The individual segments 116, 118 and the lid 120 can be made of different materials, and it is also possible that the lid 120, for example, and/or the second segment 118, has a different form from the first segment 116 (i.e. these may have a spherical form, for example, with a different radius, or they may have an ellipsoidal shape). For the reasons given above, it is preferred that the outer shape of the vessel 110 is a sphere. A fluid can be filled up to a fill level inside the second segment 118. On the inside of the first segment 116, ribs 111 (four of them, in the present case) extending to the upper edge of the first segment 116 are provided. However, more than or fewer than four ribs would also be conceivable.

As can be seen from FIG. 5, the working part 112 in the form of a rotatable blade is located on the flattened bottom side of the first segment 116. The four ribs 111 can also be seen, which are located at four points that are offset by 90° with respect to the axis of rotation of the working part 112.

Figure 4:
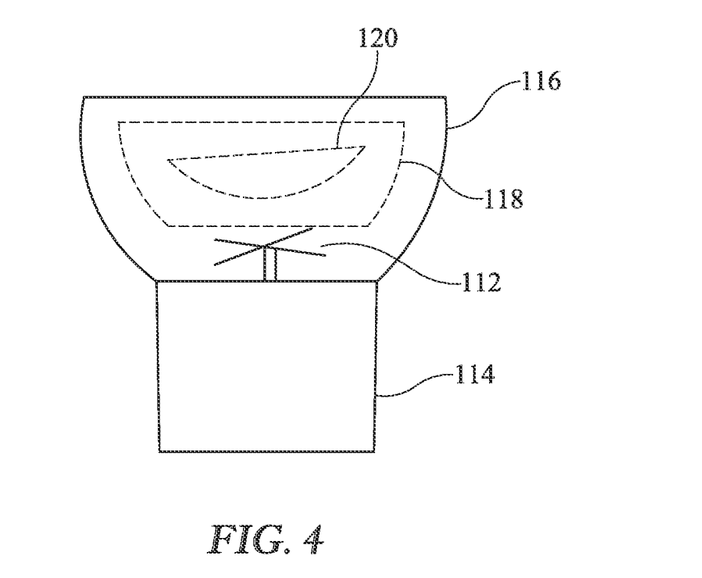
FIG. 4 schematically shows a cross section through a consolidated appliance according to the first embodiment of the invention.

FIG. 4 shows the first embodiment of the invention in a disassembled state. Here, the second segment 118 is arranged inside the first segment 116 and above the working part 112. The third segment 120 is arranged inside the second segment 118. In the state shown, the appliance can be stored in a space-efficient manner.

Figure 2:
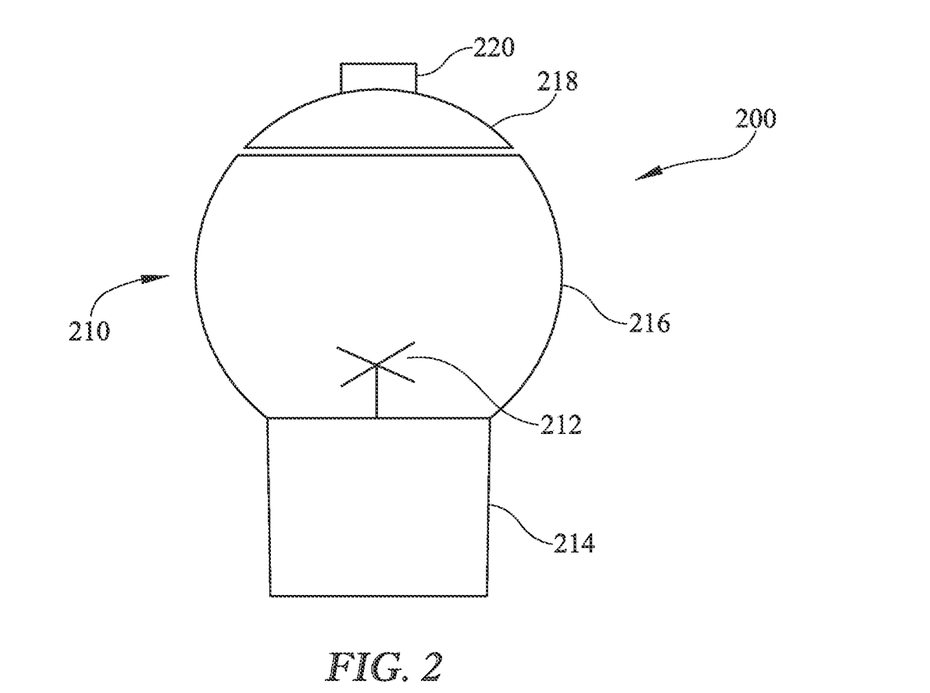
FIG. 2 schematically shows a cross section through an appliance according to a second embodiment of the invention.

FIG. 2 shows a second embodiment of the invention. Here, a first segment 216 is provided on a base 214, which segment extends significantly further upward than the comparable first segment 116 of the first embodiment. This first segment 216 also surrounds a working part 212 and is closed at the upper end by a second segment 218. This second segment 218 serves as a lid and has at its upper end an opening, which is closed by a separate closure 220. Fluids or other ingredients can be fed through this opening while the appliance is in operation. Even though ribs are not shown herein, they may nevertheless be present and they may, for example, be configured as shown with respect to the first embodiment. In this embodiment, the ribs can extend to the upper end of the first segment 216, but they may also terminate deeper in.

Figure 3:
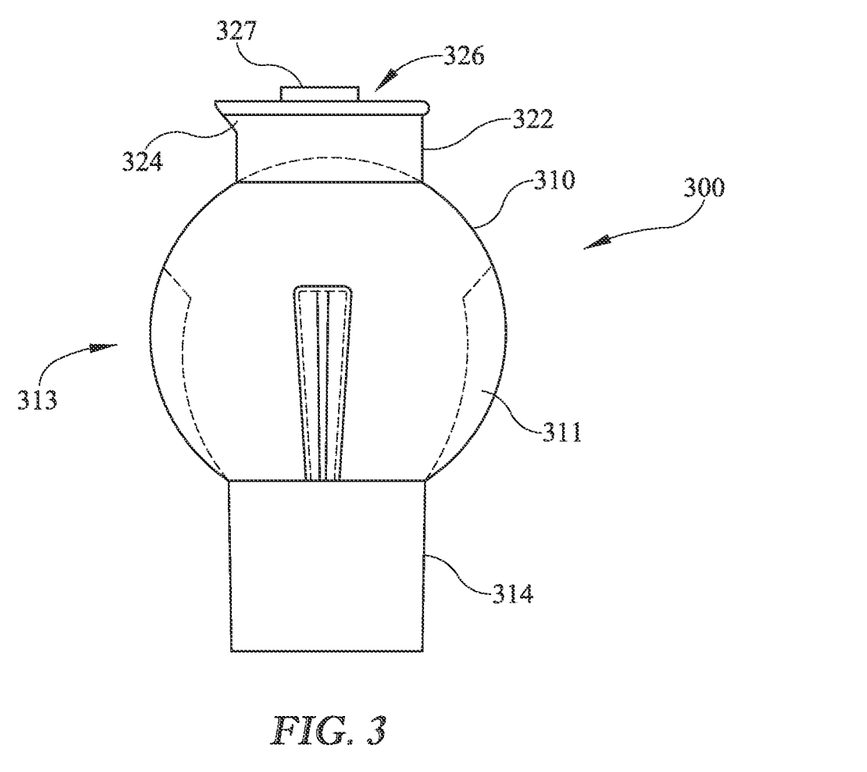
FIG. 3 schematically shows a cross section through an appliance according to a third embodiment of the invention.

FIG. 3 shows a third embodiment of the invention. The appliance 300 according to the third embodiment also has a base 314 which supports a first segment 310. This first segment 310 surrounds a working part which in this case is not shown. A second, non-spherical segment 322 having a spout 324 through which processed foods can be poured out is provided at the upper end of the first segment 310. The first segment 310 and the second segment 322 form the vessel 313. A lid 326 is provided at the upper end of this attachment 322, which closes the vessel and prevents foods to be processed from spraying out. This lid 326 also has a hole, through which pressure equalization can take place, but which prevents fluids from spraying out, or at least makes it difficult for them to do so, as compared with an open lid. Through this hole, additional ingredients can be added during operation. The hole can be closed by a closure 327. The second segment 322 can be fixedly connected to the first segment 310, or it can also be detachable.

The appliances according to the first, third and fourth embodiments described above have ribs in the interior thereof and in particular on all segments that define this interior space. It is possible to adapt the design and arrangement of these ribs to the respective dish to be prepared. For instance, to make sticky or pasty preparations such as peanut butter, for example, it may be advantageous to use a different arrangement of the ribs from the one used to make smoothies or to crush ice.

It is also possible to use different working parts. A rotating blade can be used, for example. However, it would also be conceivable to use a whisk for making whipped cream, or a blunt knife for crushing ice. In particular, the latter would have the advantage that the knife would not lose its sharpness over time and therefore has a longer service life.

Figure 7:
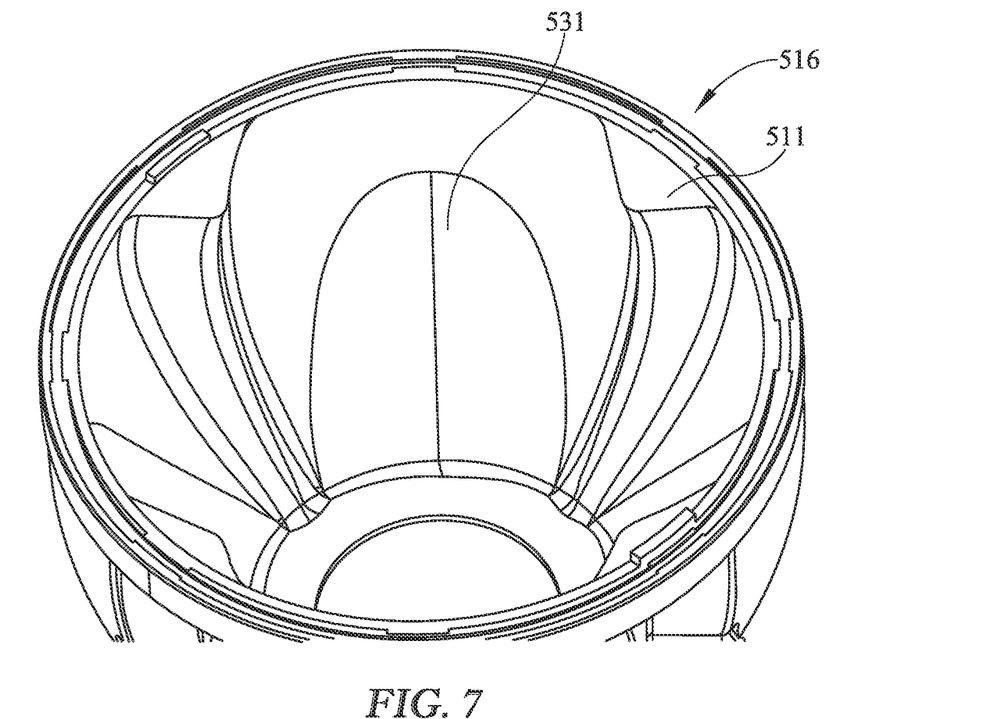
FIG. 7 is a view of a bottom part of an appliance according to a fifth embodiment of the invention.
Figure 8:
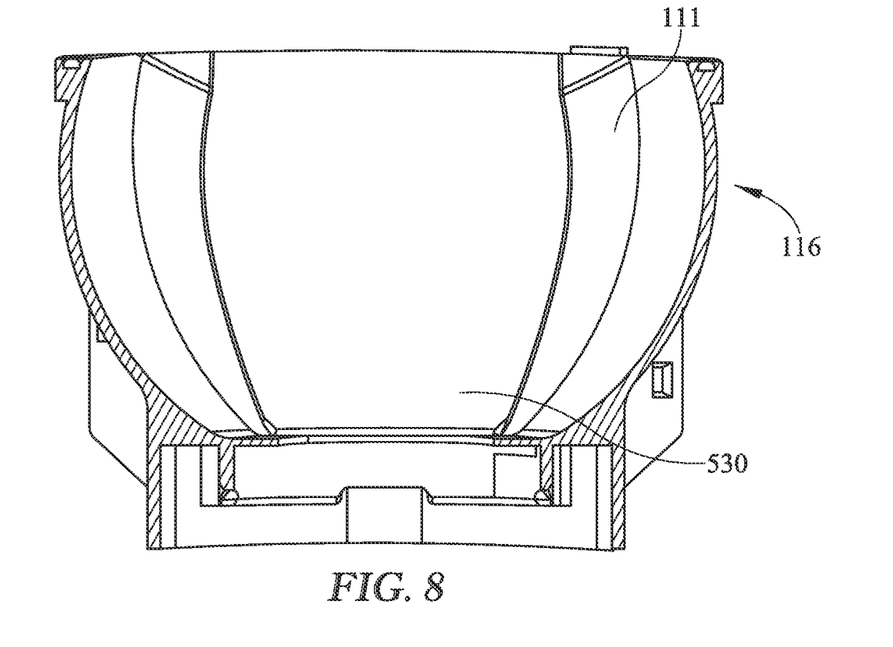
FIG. 8 is a sectional view of the appliance according to the first embodiment as compared to FIG. 7.

FIG. 7 is a view of a bottom part 516 of an appliance according to a fifth embodiment of the invention. Here, the bottom part 516 comprises ribs 511 and inner bulges 531. The inner bulges 531 are provided between the ribs 511 along the circumferential direction. This is clear in particular when compared with FIG. 8, which shows a cross section through a bottom part 116 of an appliance according to the first embodiment of the invention. Here, no inner bulge is provided in the pocket 530 in the bottom part 116 between the ribs 111. Accordingly, in the appliance according to the first embodiment, foods can remain in this pocket 530, which is prevented by the inner bulges 531.

Figure 9:
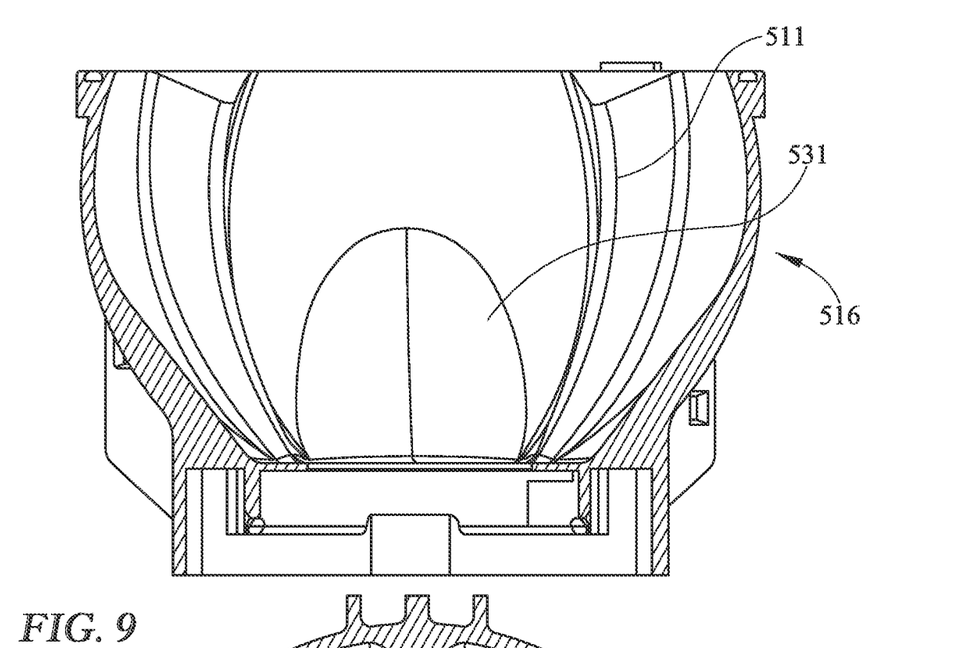
FIG. 9 is a further sectional view of the appliance according to the fifth embodiment.
Figure 10:
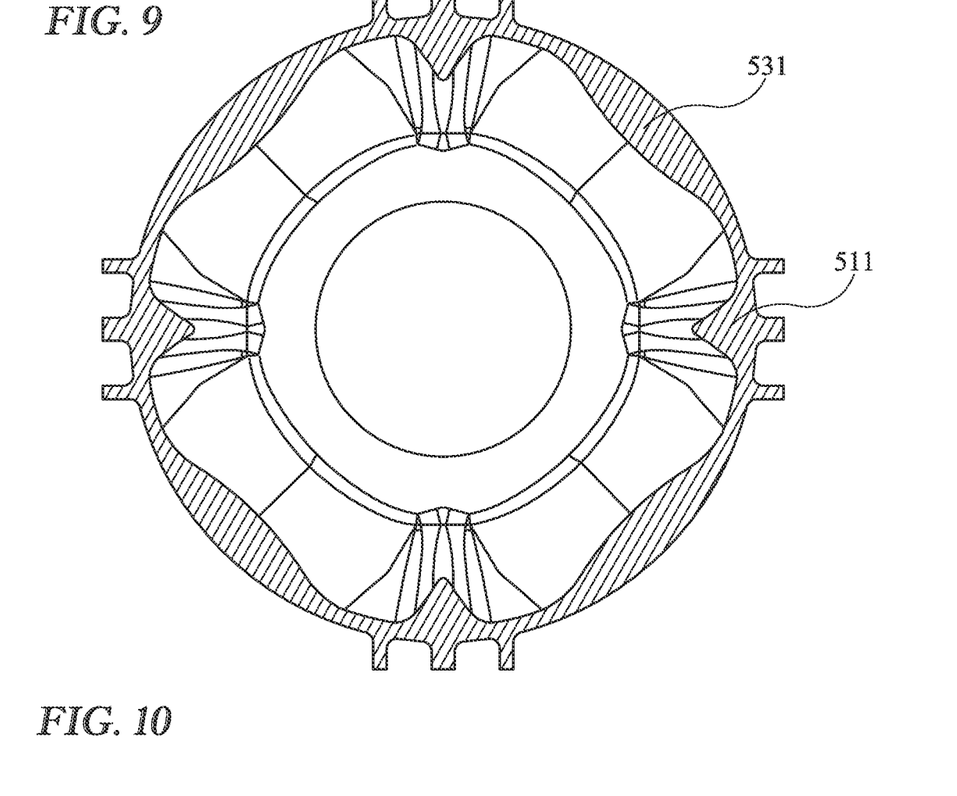
FIG. 10 is a plan view of the appliance according to the fifth embodiment.

These differences are also clear to see from FIGS. 9 and 10. Here, a bottom part 516 according to the fifth embodiment is shown in plan view (FIG. 10) and in a side sectional view (FIG. 9). This makes it clear that compared to the ribs 511 the protrusions 531 are considerably flatter and less steep. This results in the foods to be processed being directed out of the pocket without significant disruption to the flow.

Figure 11:
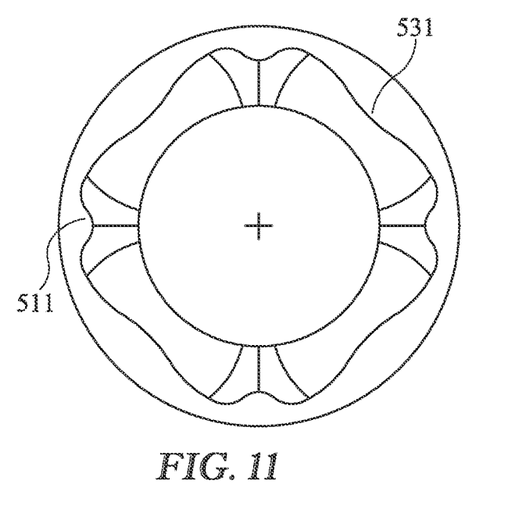
FIG. 11 schematically shows the inner bulges of the appliance of FIG. 10.
Figure 12:
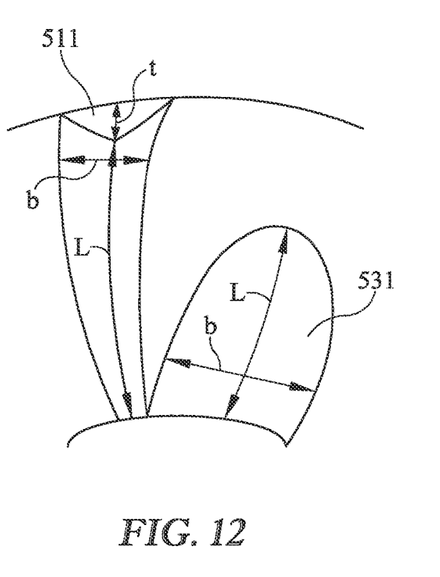
FIG. 12 is a further sectional view of the appliance of FIG. 7.
Figure 13:
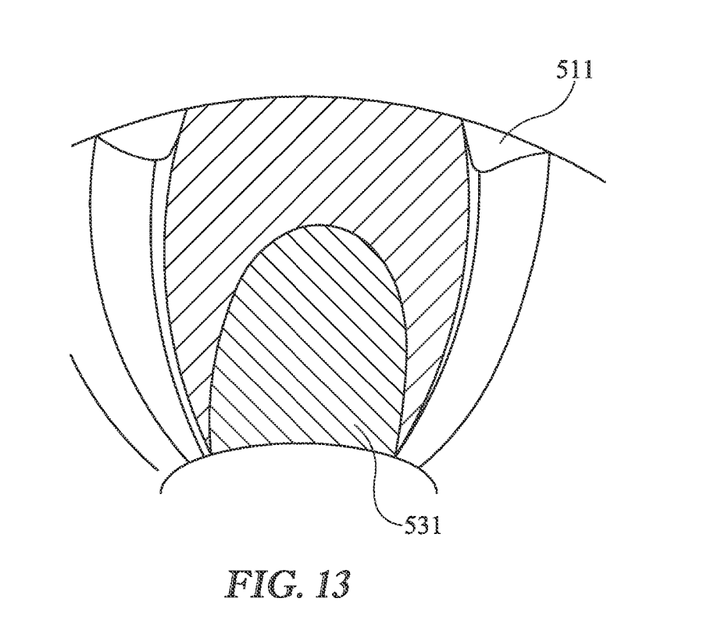
FIG. 13 is a further sectional view of the appliance of FIG. 7.

In FIGS. 11, 12 and 13, the dimensions of the ribs 511 and the inner bulges 531 are clearer to see. It can be seen that the inner bulges 531 have a shorter length L along the axial direction than the length L of the ribs 511. The ribs have a significant depth t, however, which is greater than that of the inner bulges 531. Furthermore, the width b of the inner bulges 531 is greater than the width b of the ribs 511 along the circumferential direction of the bottom part.

The invention claimed is:

1. An appliance for processing foods, comprising:
   a vessel comprising walls that define a chamber in which foods to be processed can be received, and
   a working part arranged in the chamber, which can be driven to process the foods,
   wherein the walls of the chamber comprise at least in part a spherical segment
      further comprising ribs arranged on the wall of the vessel which extends into an interior of the vessel,
      further comprising one or more inner bulges which extend between the ribs into the interior of the vessel,
      wherein the inner bulges are flatter and less steep than the ribs.

2. The appliance according to claim 1, wherein the spherical segment surrounds the working part.

3. The appliance according to claim 1, wherein the spherical segment is larger than a hemisphere, wherein the spherical segment comprises more than 70% of a total surface area of the chamber.

4. The appliance according to claim 1, wherein the vessel comprises a first segment and a second segment which are detachably connected to one another and which together define the spherical segment, wherein the first segment surrounds the working part and the second segment is arranged on the first segment.

5. The appliance according to claim 4, wherein the second segment has an opening through which air and/or fluids can be introduced into the chamber.

6. The appliance according to claim 4, further comprising a third segment detachably arranged on the second segment, wherein the second segment is annular, wherein the first segment substantially defines a hemisphere and wherein the second and third segments together substantially define a hemisphere, wherein the third segment has an opening through which air and/or fluids can be introduced into the chamber.

7. The appliance according to claim 4, wherein the second segment is arranged within the first segment.

8. The appliance according to claim 4, wherein the first and second segments can be locked to one another in a tool-free manner selected from the group consisting of a bayonet catch, a thread and a toggle lever.

9. The appliance according to claim 1, further comprising a spout for pouring out foods that have been processed.

10. The appliance according to claim 9, wherein the spout extends from a rib.

11. The appliance according to claim 1, further comprising a base on which the vessel is arranged, wherein the vessel can be detached from the base.

12. The appliance according to claim 11, wherein the base further comprises a drive for driving the working part.

13. The appliance according to claim 1, wherein the vessel has a handle.

14. The appliance according to claim 13, wherein the handle is fixedly provided on the vessel.

15. The appliance according to claim 13, wherein the handle is detached from the vessel.

16. The appliance according to claim 1, wherein the inner bulges fill at least 30% of the area between the ribs.

17. The appliance according to claim 1, wherein a ratio of a width b to a length L of the inner bulges at a widest point of the inner bulge is greater than or equal to 0.8, while the ratio of the width to the length of the ribs at the widest point of the ribs is smaller than or equal to 0.4.

18. The appliance according to claim 1, wherein a ratio of a depth t to a width b at a deepest point of the inner bulges is smaller than or equal to 0.1, while the ratio of the depth t to the width b at the deepest point of the ribs is greater than or equal to 0.5.

19. The appliance according to claim 1, wherein a side wall of the vessel is flat.

20. An appliance for processing foods, comprising:
a vessel comprising walls that define a chamber in which foods to be processed can be received, and
a working part arranged in the chamber, which can be driven to process the foods,
wherein the walls of the chamber comprise at least in part a spherical segment
further comprising ribs arranged on the wall of the vessel which extends into an interior of the vessel,
further comprising one or more inner bulges which extend between the ribs into the interior of the vessel,
wherein the inner bulges are flatter and less steep than the ribs,
wherein the inner bulges are provided between all of the ribs, and
wherein the inner bulges have an inclination with respect to the wall of the vessel that is smaller than or equal to 30°, wherein the inclination is the inclination of a tangent plane of the inner bulge at a transition to the wall with respect to the tangent plane of the wall.

21. An appliance for processing foods, comprising:
a vessel comprising walls that define a chamber in which foods to be processed can be received, and
a working part arranged in the chamber, which can be driven to process the foods,
wherein the walls of the chamber comprise at least in part a spherical segment
further comprising ribs arranged on the wall of the vessel which extends into an interior of the vessel,
further comprising one or more inner bulges which extend between the ribs into the interior of the vessel,
wherein the inner bulges are flatter and less steep than the ribs, and
wherein a length of the inner bulges along a circumferential direction of the vessel is at least 60% of the distance along the circumferential direction between the ribs.

\* \* \* \* \*